United States Patent [19]

Perdue

[11] Patent Number: 4,679,152
[45] Date of Patent: Jul. 7, 1987

[54] NAVIGATION SYSTEM AND METHOD FOR A MOBILE ROBOT

[75] Inventor: Terry A. Perdue, St. Joseph, Mich.

[73] Assignee: Heath Company, St. Joseph, Mich.

[21] Appl. No.: 703,354

[22] Filed: Feb. 20, 1985

[51] Int. Cl.$^4$ ............... G06F 15/50; G05D 1/00
[52] U.S. Cl. ............... 364/513; 364/424; 364/460; 318/587; 180/167; 901/1; 901/46; 901/47
[58] Field of Search ......... 364/424, 444, 460, 461, 364/513; 318/587; 180/167–169, 65.3; 901/1, 46, 47; 343/7 VM

[56] References Cited

U.S. PATENT DOCUMENTS

| | | | |
|---|---|---|---|
| 3,900,260 | 8/1975 | Wendt | 356/5 |
| 4,028,533 | 6/1977 | Matsubara | 180/169 |
| 4,119,900 | 10/1978 | Kremmitz | 364/513 |
| 4,309,758 | 1/1982 | Halsall et al. | 180/169 |
| 4,379,497 | 4/1983 | Hainsworth | 180/168 |
| 4,465,155 | 8/1984 | Collins | 364/424 |
| 4,500,970 | 2/1985 | Daemmer | 364/424 |
| 4,533,998 | 8/1985 | Falamak | 364/424 |
| 4,556,940 | 12/1985 | Katso et al. | 364/424 |
| 4,620,285 | 10/1986 | Perdue | 364/513 |

OTHER PUBLICATIONS

"Heath's New Training Robot Interacts with the Environment," R. N. Stauffer, Robotics Today, Dec. 1982, pp. 37–38.
"Newt: A Mobile, Cognitive Robot," R. Hollis, Byte, vol. 2, No. 6, Jun. 1977, pp. 30–45.

Primary Examiner—Michael R. Fleming
Assistant Examiner—John R. Lastova

[57] ABSTRACT

An opto/acoustic navigation system allows a mobile robot to detect and mate with a floating plug-equipped charging unit upon detection of the need for recharging of the robot's storage battery. A plurality of infrared (IR) emitters and sensors located on the robot and adjacent to the charger in combination with the robot's acoustic sensors allow the robot to locate the charger, move to within a predetermined distance of the charger, maneuver to a position directly in front of the charger, and then back into engagement with the charger's floating plug.

16 Claims, 11 Drawing Figures

NAVIGATION SYSTEM AND METHOD FOR A MOBILE ROBOT

CROSS-REFERENCE TO RELATED APPLICATION

This application is related to but in no way dependent upon the following application which is assigned to the assignee of the present application and filed in the name of the present inventor: Ser. No. 603,471, filed Apr. 24, 1984, entitled "Sonar Ranging/Light Detection System For Use In A Robot".

BACKGROUND OF THE INVENTION

This invention relates generally to the displacement of a mobile robot and is particularly directed to a navigation system and method to permit a mobile robot to detect, navigate to, and be recharged by a charging unit following detection of a low charge state in its storage battery.

The impact of robotics in areas ranging from the work place to the home is rapidly increasing. Industrial applications typically involve the high speed, repetitive performance of a specific task by a movable arm having grasping means on one end and which is generally capable of multi-axis movement. Mobile robots are similarly being used in increasing numbers of applications where it is necessary to transport an object between designated locations or to perform a given task at more than one location. In the home, mobile robotic systems are becoming increasingly popular with hobbyists as well as in toys and in electro-mechanical apparatus of an instructional nature.

Two primary considerations with regard to mobile robots relate to the manner in which the robot is powered, or energized, and to its navigation system. Some mobile robots are controlled and powered by means of an electrical cable coupled to the robot which, while simplifying the navigation system required and the number of instructions which the robot is required to "learn", limits the mobility of the robot and thus the range of tasks which it may perform. In battery powered robots the requirement for an attached power cable is eliminated and displacement of the robot typically involves the positioning of numerous sensors/emitters in the immediate vicinity of the robot or a "track" system which the robot follows in moving from place to place.

Where the mobile robot is powered by a rechargeable battery, the prior art has made use of elongated strips positioned upon the floor which the robot senses and follows in the direction of a recharging unit upon detection of a low charge condition. When the robot arrives at the recharging unit, a plug and socket arrangement is generally provided to allow the robot to mate with the charger for recharging its storage battery or batteries. In addition to the undesirable feature of requiring numerous guide strips positioned upon the surface on which the robot moves, such systems suffer from another limitation in that if the robot makes an incorrect turn while on or upon reaching the guide strip system, the robot may travel away from rather than toward the recharging unit. If this error is not detected quickly enough, the robot may become fully discharged before it arrives at the recharging unit.

The present invention represents an improvement over the prior art in that by making use of a unique navigation system and method for a mobile robot it does not suffer from the aforementioned limitations. A combined opto/acoustic navigation system permits the robot to detect a charging unit in the room within which it is positioned. The navigation system then allows the robot to detect and navigate about obstacles while traveling to a position directly in front of the charging unit to permit the robot to dock with the floating plug-equipped charging unit for the recharging of its storage battery.

OBJECTS AND SUMMARY OF THE INVENTION

Accordingly, it is an object of the present invention to provide for the recharging of a storage battery in a mobile robot upon detection of a low charge state.

It is another object of the present invention to provide for the automatic displacement of a mobile robot energized by a storage battery to a charging unit for the recharging thereof.

Yet another object of the present invention is to provide an opto/acoustic navigation system and method for use in a rechargeable mobile robot for detecting, navigating to, and engaging a charging unit.

A further object of the present invention is to provide a navigation system and method for a mobile robot which is inexpensive, highly reliable, and is adapted for use either at home or in a work environment.

The present invention contemplates an opto/acoustic navigation system to permit a rechargeable battery-powered mobile robot to detect, navigate to and mate with a socket engaging charging unit upon detection of the need for recharging. An aft portion of the robot's head is provided with a narrow vertical slot adjacent to and behind which are positioned within the head three infrared (IR) light emitting diodes (LED's) arranged in a vertical column. Also positioned on an aft portion of the head near the vertical slot is an IR photodiode. Located adjacent to the charging unit are three LED's arranged to cover an entire room and above the charging unit at robot-head height on the wall are located two IR photodiodes coupled to the charging unit. In the search mode, the three LED's within the robots's head emit a series of pulses at a first pulse rate as the head rotates. Upon detection of these pulses by the wall-mounted photodiodes, the charging unit's LED's emit a series of pulses at a second pulse rate which is detected by the robot's photodiode. The robot's head is then rotated so that the back of its head is over the front if its base which is then rotated to face the charger. The robot then moves toward the charger in a straight line using the aforementioned IR LED's and photodiodes by maintaining the back of its head and the front if its base directed toward the charging unit. Using a first sonar in its base, the robot moves to within a predetermined distance of either an object or the charging unit. A second rotating sonar sensor in an upper portion of the robot's head is then used to determine in which direction to turn for displacing the robot in a generally circular path with the object/charging unit at the center until it determines whether the object is, in fact, the charging unit by comparing the radius of the displacement path with the previously measured, predetermined distance to the object. If the charger is not detected, a semi-random "wander" routine is executed and the entire procedure is then repeated. If both distances agree, the robot's slot and IR LED's in combination with the wall-mounted mirror above the charging unit are used to directly align its charging receptacle with the charging unit's floating plug whereupon the robot moves in a straight line for engagement with the charging unit.

BRIEF DESCRIPTION OF THE DRAWINGS

The appended claims set forth in those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
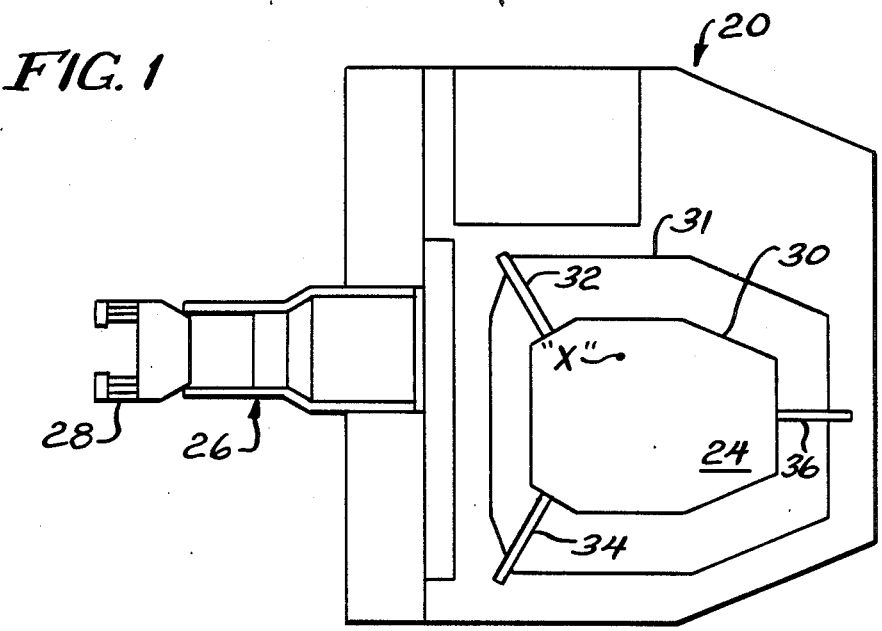
FIG. 1 is a top plan view of a robot with which the navigation system and method of the present invention is intended for use.

Referring to FIG. 1, there is shown a top plan view of a mobile robot 20 with which the navigation system and method of the present invention is intended for use.

The mobile robot 20 includes a lower body portion 22 which is provided with a plurality of wheels (not shown) by means of which the robot 20 may be displaced along a surface. Positioned on an upper portion of the body 22 of the robot 20 is a rotating head 24. Located in a forward portion of the robot's body is a movable arm 26 which includes a gripper assembly 28 on the distal end thereof. The arm 26 and gripper assembly 28 combination may be adapted to perform a wide variety of functions including the grasping, lifting and manipulation of an object.

Figure 2:
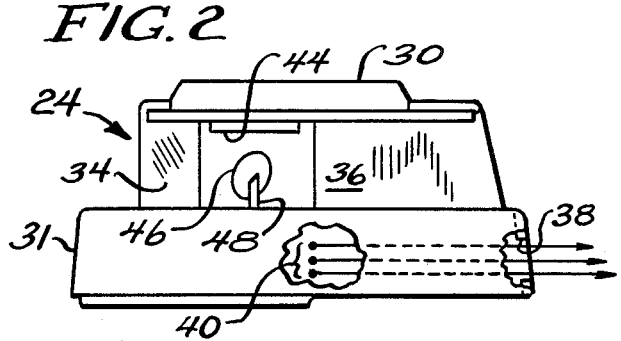
FIG. 2 is a side view of the upper, or head, portion of the mobile robot of FIG. 1.
Figure 3:
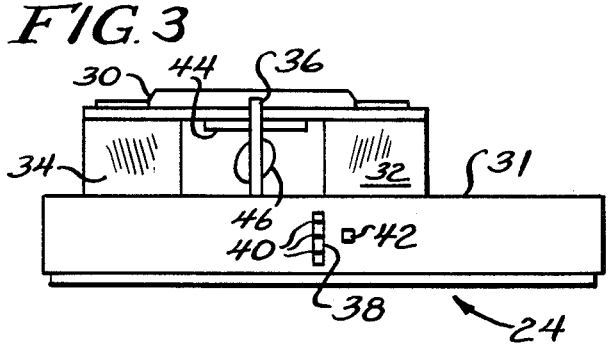
FIG. 3 is a rear view of the upper, or head, portion of the mobile robot of FIG. 1.

The robot's head 24 is free to rotate 360° on the lower body of the robot about an axis generally designated as "X" in FIG. 1. Additional details of the robot's head 24 are shown in FIGS. 2 and 3 which are side and rear views, respectively, of the head assembly. The rotating head 24 includes a lower portion, or base, 31. Securely positioned upon the lower portion 31 of the robot's rotating head 24 are a plurality of spaced support members 32, 34 and 36 which, in turn, are coupled to and provide support for a generally horizontally oriented upper panel 30 on the top of the robot's rotating head.

Positioned on a lower surface of the upper panel 30 of the rotating head 24 is an upper sonar transducer 44 which is coupled to appropriate signal generation and sensing circuitry (not shown) to permit acoustic signals to be transmitted and received. Positioned immediately beneath the upper sonar transducer 44 is the combination of a support member 48 and a rotating mirror 46. The support member 48 is rotationally coupled to the lower portion 31 of the rotating head 24 and to an appropriate drive system (not shown) for effecting the rotation of the support member. The upper end of the support member is securely coupled to the mirror 46 which rotates in unison with the support member 48.

The rotating mirror 46 is oriented at an inclined angle relative to vertical so as to reflect acoustic signals generated by the upper sonar transducer 44 in a generally horizontal direction in a 360° arc about the vertical axis designated as "X" in FIG. 1. Similarly, the orientation of the rotating mirror 46 allows for the reflection of acoustic signals incident thereon to be redirected upward into the upper sonar transducer 44 for detection and processing by appropriate circuitry (not shown) within the robot. The orientation of the upper sonar transducer 44 and the rotating mirror 46 combination provides 360° coverage about the robot 20. As described in the aforementioned cross-referenced application entitled "Sonar Ranging/Light Detection System For Use In A Robot", the details of which are hereby incorporated by reference in the present application, this arrangement allows angular distances to be measured at 15° intervals in a preferred embodiment.

Figure 12:
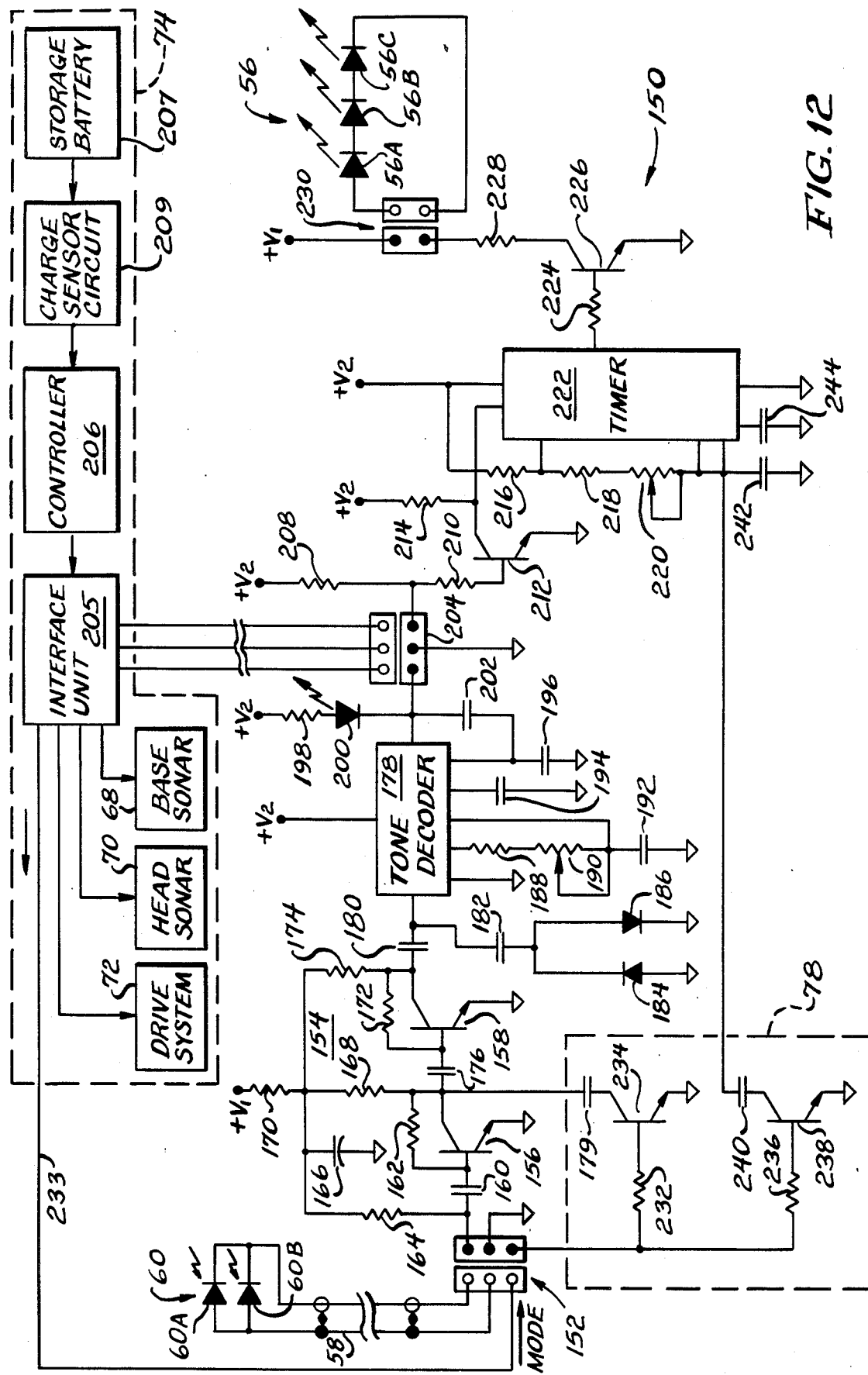
FIG. 12 is a combination simplified schematic and block diagram of a navigation system for the automatic docking of a mobile robot with a recharging unit.

Positioned within an aft surface of the base 31 of the rotating head 24 is a rear slot 38. Positioned within the base 31 of the rotating head 24 are three infrared (IR) light emitting diodes (LED's) 40 which are aligned in a generally vertical, linear configuration. The IR LED's 40 are positioned behind the rear slot 38 within the rotating head 24 and are aligned therewith. This arrangement permits light signals generated by the IR LED's 40 to be transmitted through the rear slot 30 in an angularly restricted pattern. Thus, the IR signals emitted through the rear slot 38 from the IR LED's 40 are in the form of a narrow beam transmitted generally horizontally in a 360° scan pattern as the robot's head 24 rotates. Also positioned on an aft portion of the base 31 of the rotating head 24 adjacent to the rear slot 38 therein is a photodiode 42. The photodiode 42 is responsive to and rendered conductive by IR radiation incident thereon. The circuitry employed to couple the various electronic components described thus far is shown in FIG. 12 and described in detail below.

Figure 4:
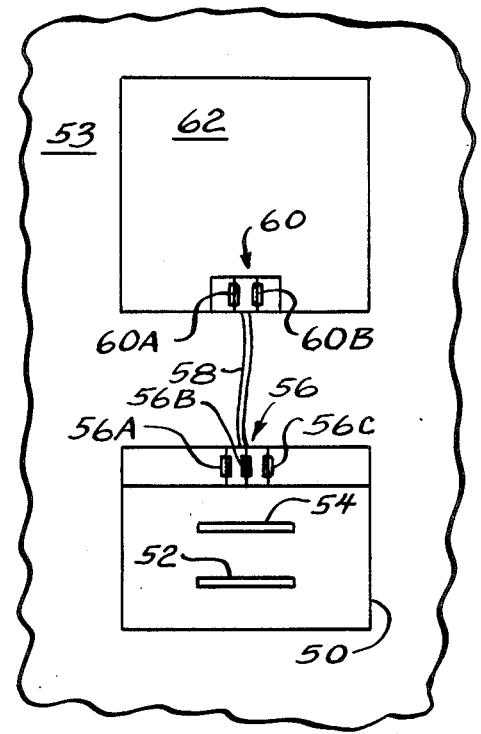
FIG. 4 is a simplified schematic of a charger in combination with a reflecting mirror and a plurality of light emitting diodes and photodiodes for use in the present invention.
Figure 5:
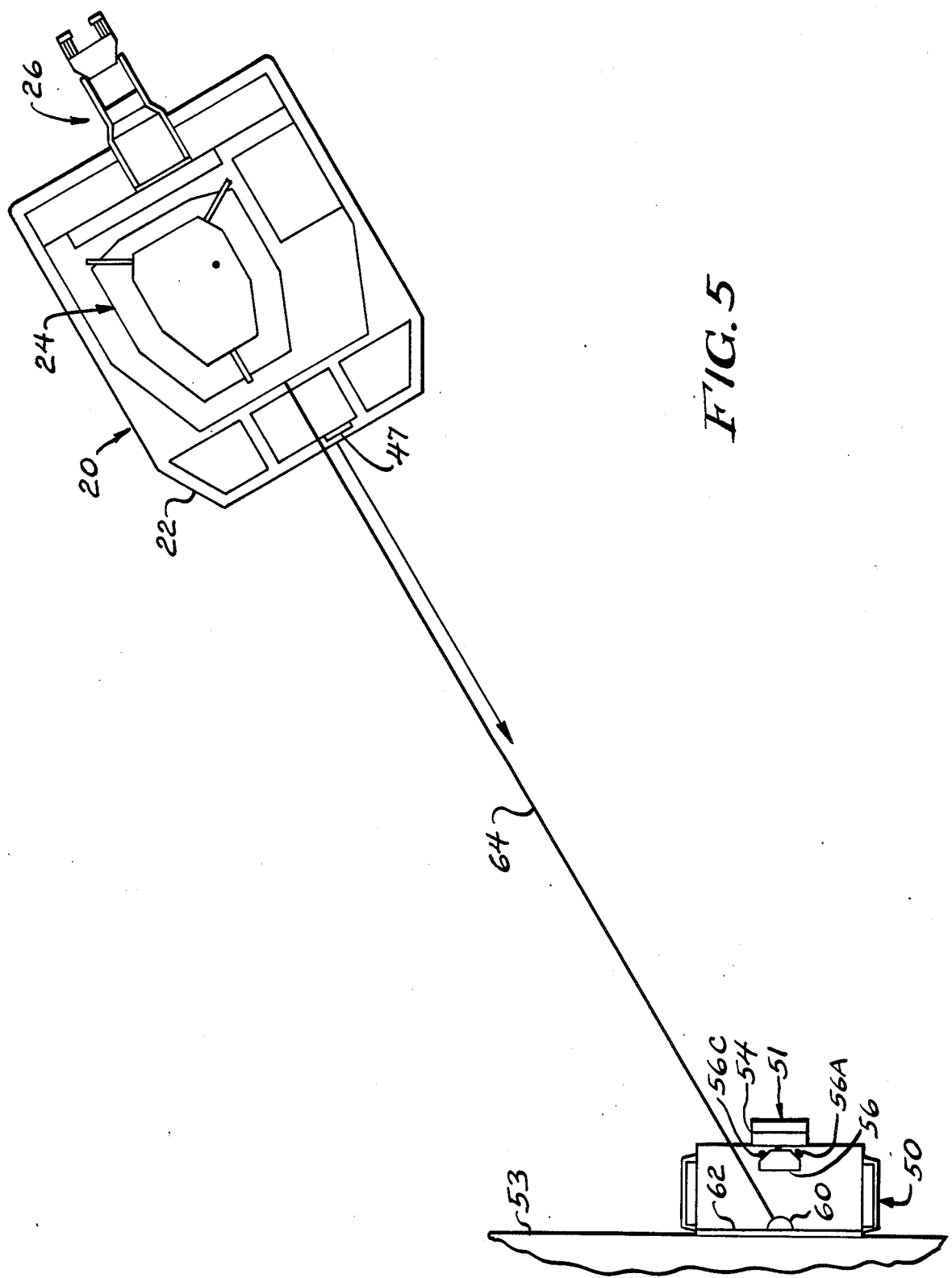
FIGS. 5 through 10 illustrate in simplified diagrammatic form the sequence of operations and displacement of the mobile robot as it detects, navigates to, and docks with the charger in accordance with the present invention.

Referring to FIGS. 4 and 5, there are respectively shown front and top planar views of a charger unit 50 for use in the present invention. The charger 50 is positioned on the floor adjacent to the wall 53 and includes a floating plug 51 on a lateral portion thereof. The floating plug 51 is positioned on that portion of the charger 50 opposite to that which is in abutting contact with the wall 53. The floating plug 51 includes first and second plug leads, or contacts, 52, 54 which are adapted for insertion within a complementary receptacle (not shown) on a rear portion of the lower body 22 of the mobile robot 20. The receptacle in the robot 20 is much longer than the floating plug 51 on the charger 50 which facilitates the docking, or interfacing, of the robot 20 with the charger 50 even when the mobile robot is not in perfect alignment with the charger.

On an upper surface of the charger 50 is positioned a pod 56 which contains three IR LED's 56A, 56B and 56C. These three IR LED's are aimed slightly upward above horizontal and are oriented in a fanned-out manner so as to cover the entire room of which the wall 53 defines one lateral surface. This arrangement of the three IR LED's 56A, 56B and 56C permits the photodiode 42 on the robot to detect an IR signal emitted from the IR LED pod 56 from anywhere within the room, provided an obstacle is not interposed between the robot's head 24 and the charger's IR LED pod 56. IR signals emitted by the charger 50 are received directly by the robot's photodiode 42.

Also mounted on the wall 53 directly above the charger 50 and at the same height above the floor as the robot's head is a photodiode module 60 containing first and second photodiodes 60A, 60B. The photodiode module 60 is coupled to the charger 50 by means of a thin shielded cable 58 and is positioned immediately forward of a mirror 62 securely mounted to the wall 53. The photodiode module 60 projects outwardly from the mirror 62 to permit the first and second photodiodes 60A, 60B to detect an IR signal transmitted by the robot 20 from anywhere within the room.

Figure 10:
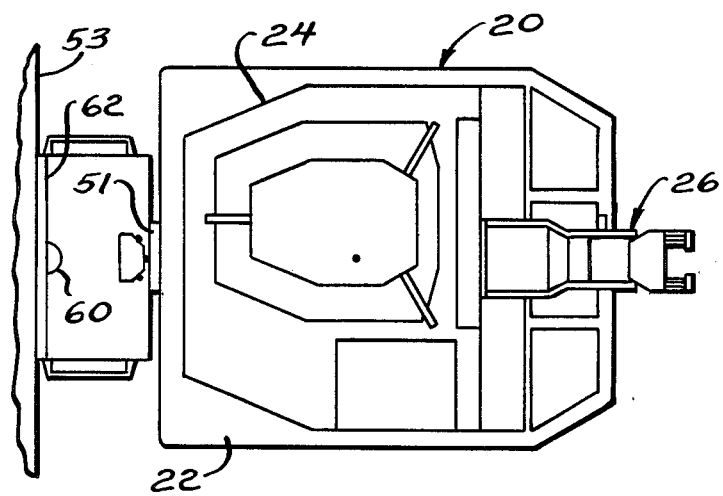
Figure 11:
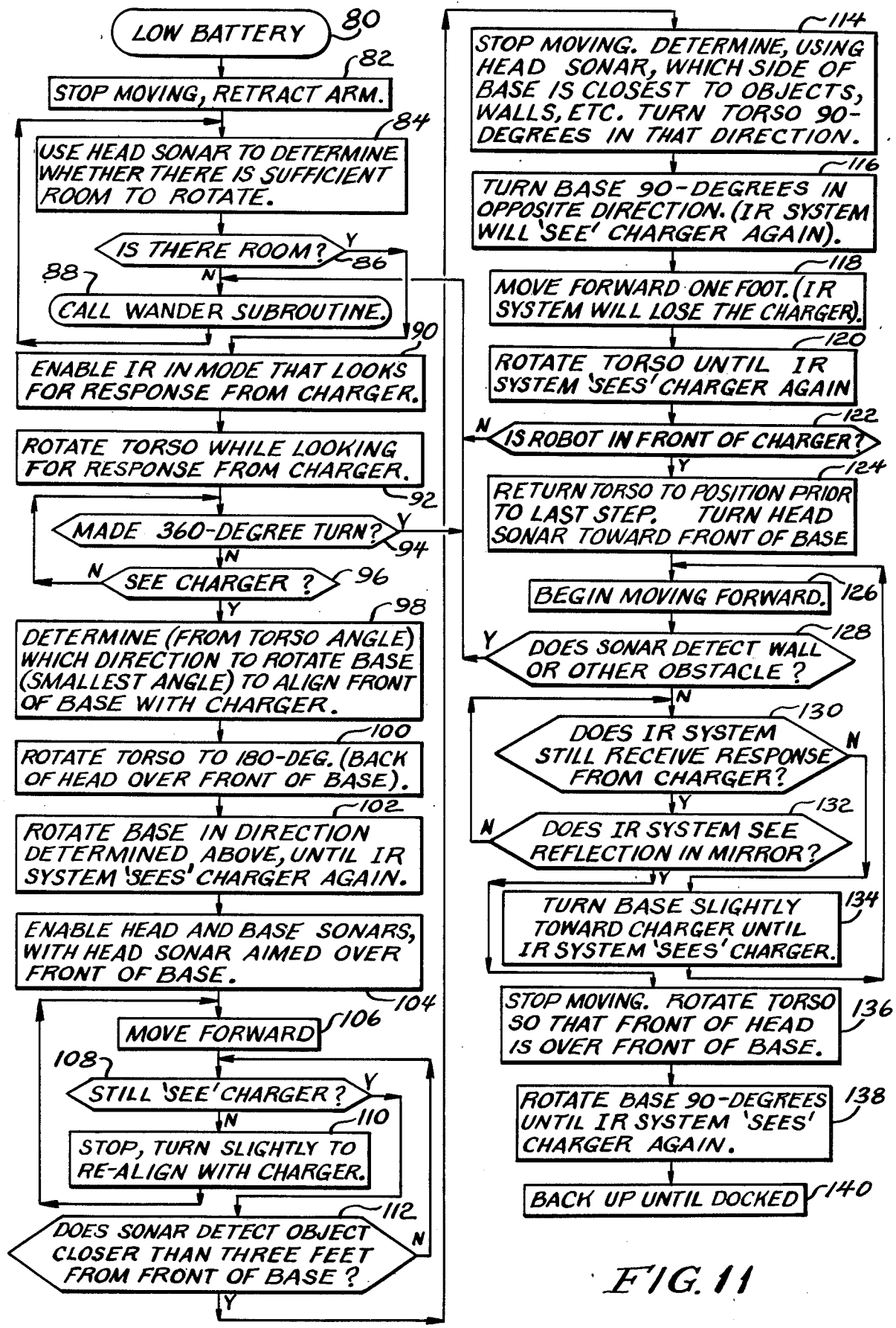
FIG. 11 is a flow chart illustrating the sequence of operations executed during the displacement of a mobile robot to a charging unit in accordance with the present invention.

The function of the mirror 62 as well as other features of the charger 50 and robot 20 as utilized in the mobile robot navigation system and method of the present invention are described in detail in the following paragraphs. The operation of the mobile robot navigation system and method is discussed in terms of FIGS. 5 through 10 which illustrate the operating sequence of events in the charger and the robot as it docks with the charger. A flow chart representing the various operations carried out by the robot and the charger is illustrated in FIG. 11. FIG. 12 is a simplified schematic diagram of circuitry for use in the robot and the charger in carying out the principles of the present invention.

As shown in FIG. 11, the first step 80 in the operating program stored within a microcomputer, or controller, 206 (shown in FIG. 12) involves the detection of a low charge state of a storage battery 207 which energizes the mobile robot 20. The charge state of the battery 207 is detected by a charge sensor circuit 209 which may be conventional in design and operation and which provides an appropriate signal to the controller 206. After determining that its battery requires re-charging, the robot 20 stops its base motors (not shown) and retracts its extendable arm 26 (if installed on the robot) at step 82. The operating program within the robot's controller 206 then determines if the robot is able to detect the charger 50. Before doing this, the operating program first ensures that the robot has sufficient room to rotate where it is currently standing at step 84. This is accomplished by means of the robot's rotating head sonar including the upper sonar transducer 44 and the rotating mirror 46. If it is determined at step 86 that there is sufficient room for the robot to rotate so that its retracted arm 26, which turns with its rotating head 24, will not strike anything, the operating program jumps to step 90 and enables the three IR LED's 40 within the robot's head to transmit pulses through the rear slot 38 at a 50 kHz rate. Rotation of the robot's head is then initiated at step 92. If at step 86 it is determined that there is not sufficient room in the immediate vicinity of the robot to rotate without its retracted arm 26 contacting a nearby object, the robot executes a pseudo-random "wander" subroutine at step 88 to position the robot elsewhere in the room and again determines whether there is sufficient room to rotate its head following completion of this "wander" subroutine.

The operating program at step 94 then determines whether a full 360° rotation of the robot's head has occurred. If the robot's head has made a full 360° revolution, the program branches back to the "wander" subroutine at step 88 in order to randomly move the robot to another location and to begin again searching for the charger 50. If at step 94 it is determined that the robot's head has not rotated a full 360°, the operating program at step 96 then determines if the charger 50 has been detected. If the charger has not yet been detected, the program branches back to step 94 where rotation of the robot's head continues.

Detection of the charger 50 indicated at step 96 is accomplished in the following manner. As the robot's head 24 rotates, the robot "looks" for the charger by turning on the three IR LED's 40 within its head 24 so as to emit a 50 kHz pulse train through the rear slot 38 in the robot's head. If there is a line-of-sight path from the robot's head 24 to the charger 50, then when the back of the robot's head is facing the charger, the first and second photodiodes 60A, 60B in the photodiode module 60 positioned above the charger will be aligned with the transmitting IR LED's 40 through the rear slot 38 and will detect the 50 kHz pulses output therefrom. This causes the circuitry within the charger 50 (which is shown in FIG. 12 and described below) to pulse the three IR LED's 56A, 56B and 56C within the IR LED pod 56 on top of the charger 50 to respond with an emitted IR signal at 35 kHz. This 35 kHz IR signal is then detected by the photodiode 42 on a rear portion of the robot's head 24 as it rotates at step 96.

The operating program then determines at step 98 from the angular displacement between the robot's lower body 12 and its head 24 which direction to rotate its lower body so as to traverse the smallest angle in aligning the front of its lower body 22 with the charger 50. The head 24 of the robot is then rotated so as to position the back of the head over the front of the robot's lower body 22 at step 100. The lower body 22 of the robot is then rotated until its IR LED's 40 are directed through the rear slot 38 toward the charger 50 so as to permit the LED's within the IR LED pod 56 positioned upon the charger to illuminate the photodiode 42 in the robot's head at step 102.

Figure 6:
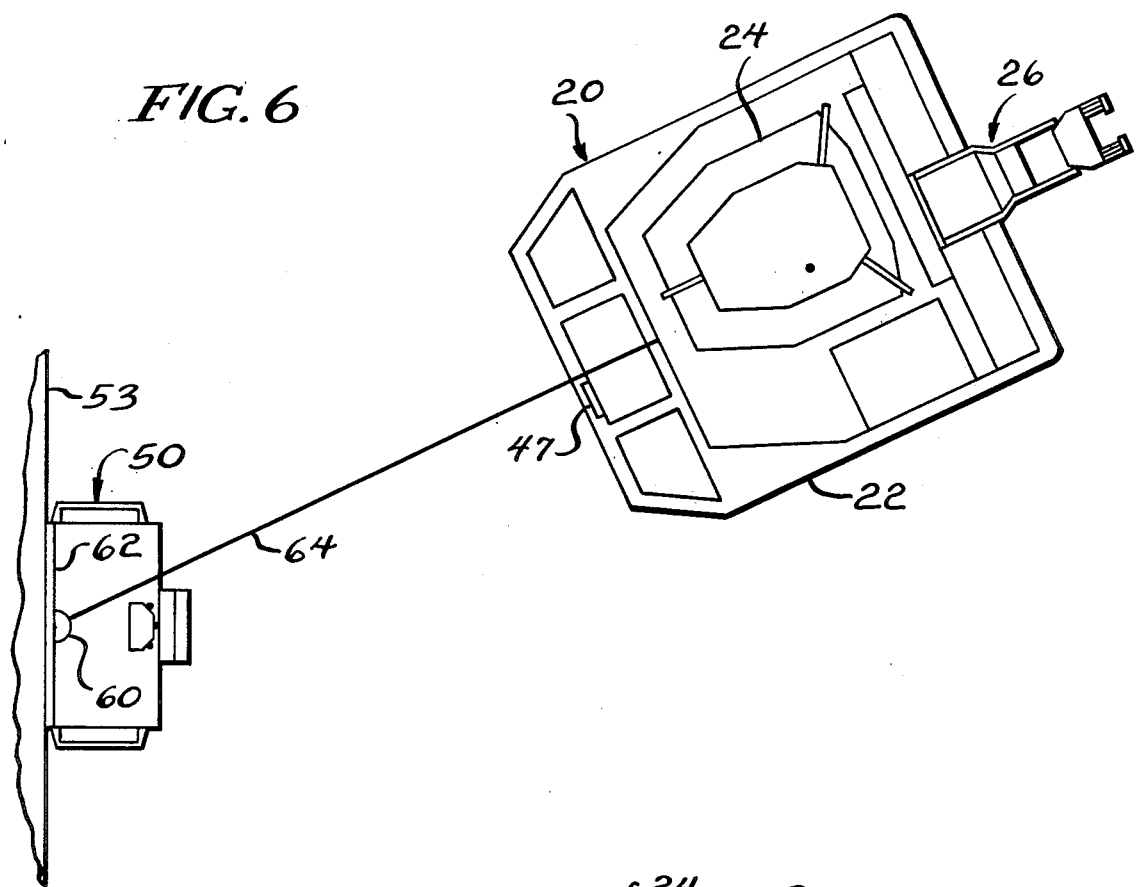

Following alignment of the rear of the robot's head 24 with a front surface of its lower body 22, the head and base sonars of the robot are enabled at step 104. The head sonar includes the upper sonar transducer 44 as well as the rotating mirror 46 within the robot's head 24, while the base sonar includes a transducer 47 mounted to a forward surface of the robot's lower body 22. The operating program then causes the robot to begin moving forward at step 106 while maintaining the robot's IR LED's 40 in alignment through the rear slot 38 with the charger's photodiodes 60A, 60B as shown by the IR beam 64 in FIG. 5. The operating program continues to monitor for receipt of the IR signal from the charger's IR LED's 56A, 56B and 56C by the robot's photodiode 42 to ensure that the head of the robot is thus in alignment with the charger and that the robot continues to move directly toward the charger 50. The robot is capable of executing small course changes at step 110 under the control of the operating program to ensure that it continues to proceed directly toward the charger 50 as it moves forward. Thus, if sight of the charger is lost by the IR detection system of the robot at step 108, forward motion of the robot is stopped and a slight turn is executed in order to realign the optical emission and detection system of the robot with the charger. If the robot remains in alignment with the charger as it moves forward, the program branches to step 112 and determines by means of its lower sonar, which includes the base sonar transducer 47, whether it is within a predetermined distance from the charger. In a preferred embodiment, this distance is set at three feet. If the base sonar detects an object within three feet of the front of the robot's lower body at step 112, the robot stops as shown in FIG. 6 and uses its rotating upper sonar to determine in which direction to turn in order to position itself in front of the charger. This is accomplished by comparing the sum of distances to objects to the right of the robot to the sum of distances to objects to the left of the robot. The sum of distances which is greater determines in which direction the robot must turn in order to travel to a point directly in front of the charger.

Figure 7:
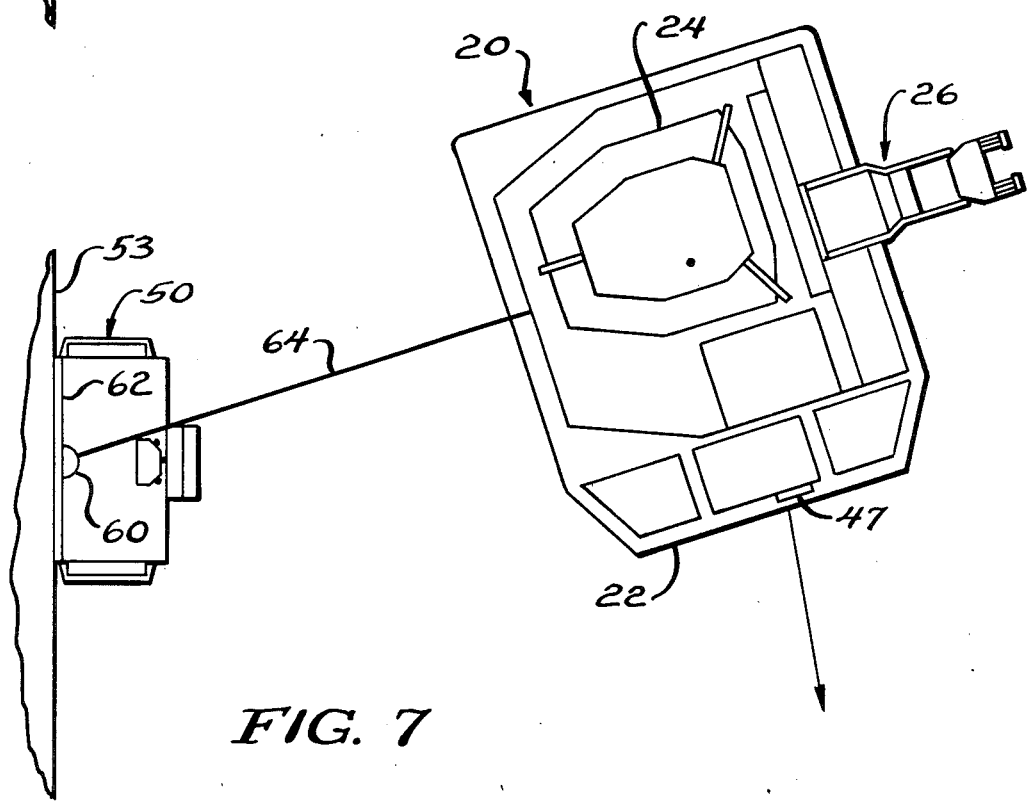

The robot then executes a 90° turn in the direction toward the largest detected sum of distances to objects on the right and left of the detected object immediately in front of it at step 116, with the robot displaced in a generally circular path with the charger at the center of the circle as shown in FIG. 7. In this procedure, the robot's head is turned 90° toward the closest detected objects as previously described with respect to step 114, followed by a 90° turn of the base in the opposite direction at step 116 until IR contact is reestablished to permit the robot to move in a circular path relative to the detected object. The robot's head then remains fixed relative to its base, with the front of its head oriented 90° relative to the front of its base.

The robot is then displaced forward one foot as shown in FIG. 6 causing loss of IR contact with the charger at step 118. The robot's head is then rotated so that its IR LED's are again directed through the slot therein toward the charger at step 120. The angle through which the robot's head is rotated provides an indication of the distance from the robot to the charger. If it is determined by the robot that this distance is greater than the aforementioned predetermined distance to the charger, i.e., greater than 3 feet, as measured by its base sonar, then the detected object is not the charger but rather is something positioned between the robot and the charger. If at step 122, it is determined that the robot is positioned in front of another object rather than the charger, the program branches to step 88 and again executes the "wander" subroutine.

If at step 122, it is determined that the object in front of the robot is indeed the charger, the robot turns its head so as to orient the back of its head 90° relative to the front of its base at step 124. The robot then begins moving forward at step 126 in a circular path around the charger as shown in FIG. 7. By thus maintaining the head oriented toward the charger and fixed relative to its base and at a 90° angle relative thereto, the robot moves in a circular path with the charger at the center of the circle. If the base sonar detects an object in the path of the robot as it moves around the charger, the program at step 128 branches back to the "wander" subroutine at step 88 in order to circumnavigate this object. If at step 128 the base sonar does not detect an object between the robot and the charger, the operating program continues to monitor the IR detection system which includes the IR LED's and photodiodes of the robot and the charger at step 130 with the robot transmitting IR signals at 50 kHz and looking for IR signals from the charger at 35 kHz. If contact with the charger is lost as determined at step 130, the program branches to step 134 and causes the robot to turn toward the charger until contact is re-established while moving in a circle about the charger.

As the robot travels in this circular path, it periodically reduces the sensitivity of its IR receiver while reducing the frequency of the transmitted IR signal from 50 kHz to 35 kHz in order to match the frequency of its IR receiver. Circuitry (described below) coupled to the photodiode module 60 on the charger 50 will not respond to 35 kHz signals transmitted by the robot. Thus, only when the robot 20 is directly in front of the charger 50 and the mirror 62 will the IR signal emitted through the rear slot 38 in the robot's head 24 be reflected back to the robot's IR detecting photodiode 42 by the mirror 62. The IR system within the robot 20 then alternates between the two frequency transmission modes of 50 and 35 kHz, alternately orienting the back of its head toward the charger to traverse the aforementioned circular path and looking for an IR reflection at 35 kHz from the wall-mounted mirror 62 indicating that the robot is directly in front of the charger. By periodically reducing its sensitivity to received 35 kHz IR signals, the robot is responsive only to 35 kHz signals reflected back to its photodiode 42 when positioned directly in front of the mirror 62.

Figure 8:
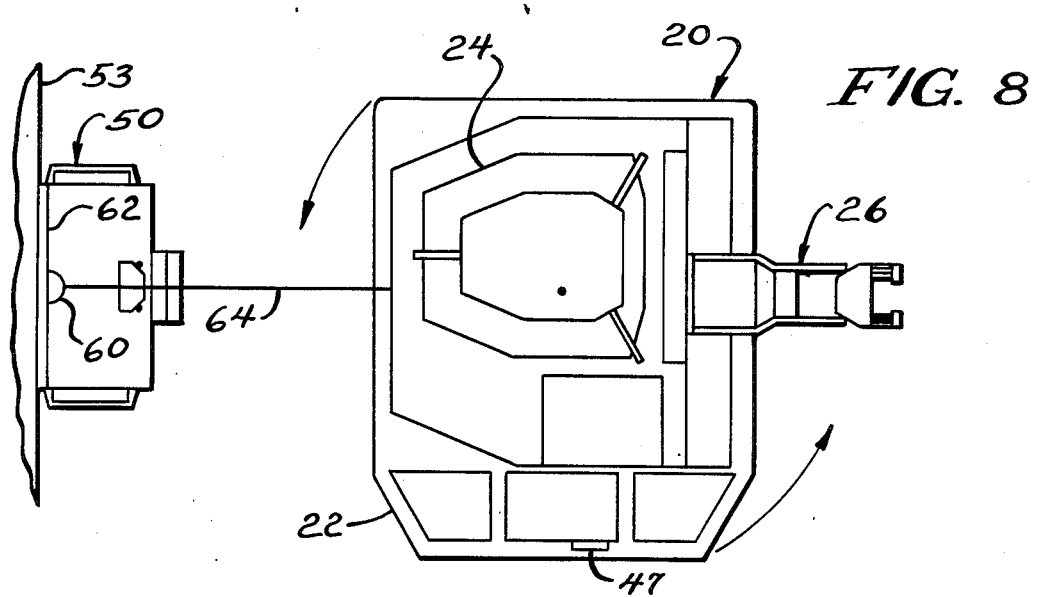
Figure 9:
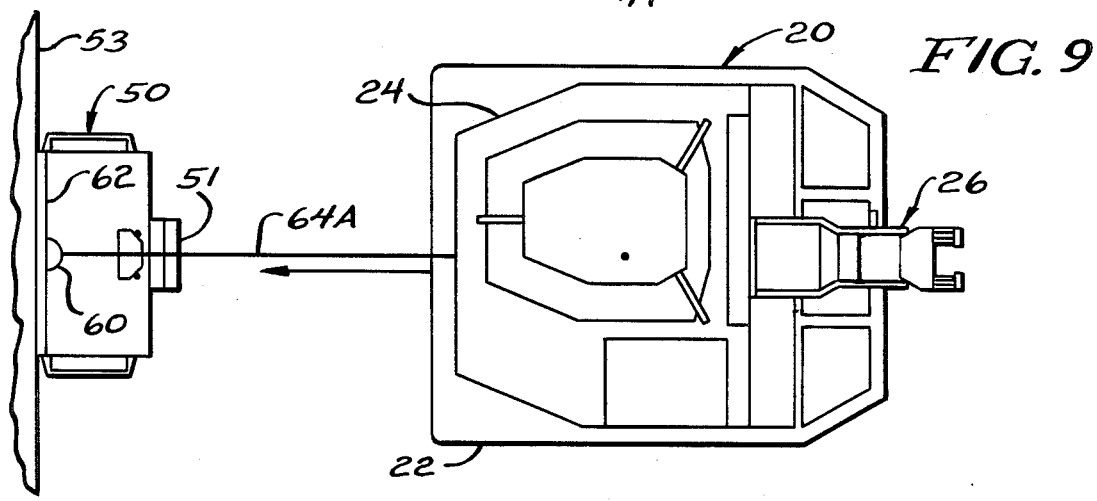

Once the robot determines that it is directly in front of the charger 50, it stops moving in a generally circular path and rotates its head 24 so that the front of its head is positioned above the front of its lower body 22 at step 136, resulting in its IR system losing contact with the charger. The lower body and head of the robot are then rotated 90° so that an aft surface of the lower body is directed toward the charger 50 as shown in FIG. 8. IR contact is re-established with the charger once the robot's head is rotated 90° such that the back of its head is directed toward the charger. The operating program at step 140 then causes the robot 20 to back up in the direction of the arrow shown in FIG. 9 toward the charger 50 until it senses engagement with the first and second plug contacts 52, 54 of the charger 50. Once docking with the charger 50 is detected by the robot 20, it stops moving and is positioned in electrical engagement with the floating plug 51 of the charger as shown in FIG. 10.

Referring to FIG. 12, there is shown in simplified block and schematic diagram form a navigation control system 150 for use with a mobile robot in accordance with the present invention. The navigation control system 150 is used in both the mobile robot and the charger and is directed to the control of the optical and acoustic emitters and sensors for controlling the displacement of the robot. Those circuit elements and components unique to the robot are included within blocks 74 and 78 shown in dotted line form in the figure and described in detail below. Details of the acoustic portion of the present invention are described in detail in the co-pending application entitled "Sonar Ranging/Light Detection System For Use In A Robot", cross-referenced above, the details of which are hereby incorporated by reference in the present application. The navigation control system 150 will now be described in terms of its use in the charger, with the minor modifications required for implementation within the mobile robot pointed out where appropriate in the following paragraphs.

The photodiode module 60 which includes first and second photodiodes 60A and 60B is coupled via a shielded cable 58 and a connector 152 to a two-stage amplifier 154 which includes NPN transistors 156 and 158. In the mobile robot, the photodiode module 60 is replaced by the single photodiode 42 positioned on an aft portion of the robot's rotating head. The first and second photodiodes 60A, 60B are used in the charger 50 to provide 180° coverage for the received IR signals incident thereon from the mobile robot. The IR signals received by the first and second photodiodes 60A, 60B are amplified by the two-stage amplifier 154 which provides approximately 80 dB of voltage gain. The amplified output of the two-stage amplifier 154 drives a tone decoder 178. Within the two-stage amplifier 154, resistor 164 provides proper biasing for the first and second photodiodes 60A, 60B. Resistor 170 and grounded capacitor 166 provide filtering for the $+V_1$ input voltage provided to the two-stage amplifier 154. In a preferred embodiment, $+V_1 = +12$ VDC. Resistors 162 and 168 provide a voltage dividing function for proper biasing of the first NPN transistor 156 in the two-stage amplifier. Similarly, resistors 172 and 174 provide biasing in dividing down the input voltage $+V_1$ for the second NPN transistor 158 within the two-stage amplifier 154. Capacitors 160 and 176 provide AC coupling of the received IR signal respectively to the bases of NPN transistors 156 and 158.

The amplified output of the two-stage amplifier circuit 154 is provided via a coupling capacitor 180 to the tone decoder 178. Back-to-back coupled, grounded diodes 184 and 186 limit the input signal provided to the tone decoder 178 to prevent false triggering of the tone decoder at spurious input signal frequencies. Capacitor 182 which couples the back-to-back coupled diodes 184 and 186 to the input of the tone decoder 178 provides DC isolation for the input to the tone decoder in order to prevent these diodes from changing the DC bias level at the input of the tone decoder. The tone decoder utilized in a preferred embodiment of the present invention is the 567 tone decoder integrated circuit which includes a phase lock loop (PLL).

Resistors 188 and 190 in combination with grounded capacitor 192 establish the operating frequency of the tone decoder 178. Variable resistor 190 allows the frequency of the tone decoder to be manually tuned for proper frequency alignment. LED 200 which is coupled to $+V_2$ via resistor 198 provides a visual indication when the tone decoder 178 is properly aligned in frequency. Various operating characteristics of the tone decoder 178, e.g., frequency, bandwidth, settling time, etc., are established by the values of grounded capacitors 194 and 196. Similarly, capacitor 202 adds AC hysteresis in the PLL of the tone decoder 178 so that it is triggered more reliably at the desired signal level.

The tone decoder 178 is energized by a $+V_2$ voltage source which, in a preferred embodiment, is at $+5$ VDC. If the received IR signal is within the capture range of the PLL detector within the tone decoder 178, the output of the tone decoder goes low and is provided via resistor 210 to the base of NPN transistor 212. Resistor 208 is a pull-up for the open-collector output of the tone decoder 178. NPN transistor 212 inverts the output of the tone decoder 178 and provides it to the input of a timer circuit 222 which, in a preferred embodiment of the present invention, is a 555 timer integrated circuit. The low output of the tone decoder 178, inverted by NPN transistor 212, enables the timer circuit 222 which is used as an astable multivibrator. Resistor 214 is a pull-up for transistor 212.

The frequency of the timer circuit 222 is established by the values of capacitor 242 and resistors 216, 218 and 220, the last of which is variable and allows the frequency of the timer circuit to be manually adjusted. The output of the timer circuit 222 is provided via resistor 224 to the base of an NPN switching transistor 226 which, in turn, provides a pulsed output via resistor 228 and connector 230 for driving the three LED's 56A, 56B and 56C in a pulsed manner. The three aforementioned LED's may be either in the IR LED pod 56 on the charger or may be within the robot's rotating head 24 and positioned behind the rear slot 38 therein.

Those subsystems unique to the mobile robot and with which the circuitry of FIG. 12 interfaces are included within block 74 which is shown in dotted line form in the figure. For example, the controller 206 is coupled to a robot drive system 72 which provides for the displacement of the robot from point to point. The controller is further coupled to the robot's head sonar 70 as well as to its base sonar 68 which respectively include the upper sonar transducer 44 and the base sonar transducer 47 for generating acoustic outputs therefrom and processing received acoustic signals. The controller 206 is also coupled via connector 204 between the tone decoder 178 and the NPN switching transistor 212 and is responsive to the output of the tone decoder. The controller 206 is also coupled via a charge sensor circuit 209 to a storage battery 207 within the robot for detection of a low charge state therein. Following detection of a low charge in the storage battery 207, the controller 206 initiates the previously described operating sequence illustrated in FIG. 11. In the charger 50, the controller is not present and the square wave pulsed output of the tone decoder 178 is provided only to the base of the NPN switching transistor 212 for driving the timer circuit 222 as previously described.

In a preferred embodiment of the present invention, the controller 206 is an Intel 8088 which is coupled to the charge sensor circuit 209 for monitoring the charge status of the storage battery 207. An Intel 8042 Universal Peripheral Interface (UPI) microcomputer is used as an interface unit 205 for coupling the controller 206 to the drive system 72, the base and head sonars 68, 70 as well as to various other components within the navigation control system 150 following detection of a low charge state in the storage battery 207. Thus, within the robot, upon detection of a low charge state in the storage battery 207, the controller 206 provides an appropriate output via the NPN switching transistor 212 to the timer circuit 222 for energizing the three IR LED's 40 within its rotating head as it initiates a search for the charger. After the charger has been located and the robot is displaced in a generally circular path about the charger, the controller 206 provides a MODE control signal via line 233, connector 152 and biasing resistor 232 to the base of NPN transistor 234. This MODE control signal is used to reduce the frequency of the IR signal emitted by the IR LED's 40 within its rotating head from 50 to 35 kHz in the following manner.

The MODE control signal utilized in the robot is provided from the controller 206 to the base of NPN transistor 234 and renders it conductive permitting it to shunt most of the signal within the two-stage amplifier 154 to neutral ground potential via coupling capacitor 179. This has the effect of lowering the gain and sensitivity of the navigation control system 150 to ensure that a received IR signal is reflected from the mirror 62 positioned above the charger 50 rather than from some other object. In addition, the MODE control signal is also provided via resistor 236 to the base of NPN transistor 238 which, in combination with capacitor 240 lowers the operating frequency of the timer circuit 222 and the frequency of the pulsed output therefrom. The reduced frequency output of the timer circuit 222 provided to the IR LED's within the robot's rotating head via transistor 226 reduces the frequency of the IR signal emitted from the LED's from 50 to 35 kHz. It is in this manner that the frequency of the IR signal emitted from the three LED's positioned within the robot's rotating head is reduced as the robot attempts to position itself directly in front of the charger. The tone decoder 178 in the charger will not respond to this reduced frequency. Thus, only when the robot is directly in front of the charger will the IR signal emitted through the slot in the robot's head be reflected back to the IR detector on its head by the mirror over the charger. The IR signal transmission system in the robot therefore alternates between these two frequency modes, first aiming the back of its head at the charger to maintain it traveling in a circular path about what it has determined to be the charger as described above while emitting a higher frequency IR signal, and then looking for a reflection of its reduced frequency IR output signal from the mirror positioned immediately above the charger in order to determine when it is directly in front of the charger and thus in position to begin the docking procedure.

There has thus been shown a navigation system and method which permits a mobile robot to detect, navigate to, and dock with a charging unit following detection of a low charge stage in its storage battery. The present invention permits the robot to detect the charging unit anywhere within the room in which it is, to travel toward the charger while accommodating other objects positioned between it and the charger, position itself directly in front of the charger, and dock with the charger to permit its storage battery to be recharged. The navigation system and method of the present invention makes use of sonar and IR emitters/detectors for accurately positioning the robot relative to the charger.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a mobile robot having a rechargeable storage battery, a method for guiding said robot to a charger positioned adjacent to a wall following detection of a low charge state in said storage battery, said method comprising:

transmitting from the robot a first narrow beam infrared (IR) signal in a 360° scan about the robot;
   detecting said first IR signal at the charger and transmitting a second generally omnidirectional IR signal from the charger in response to receipt of said first IR signal thereat;
   detecting said second IR signal at the robot and displacing said robot in a generally linear first direction toward the charger until the robot is within a predetermined distance from the charger;
   displacing the robot in a generally circular second direction when the robot is within said predetermined distance from the charger, wherein said second direction is initially transverse to said first direction and the charger is positioned at the center of the robot's circular displacement path;
   transmitting a third narrow beam IR signal from the robot in the direction of the charger during the circular displacement thereof;
   reflecting said third IR signal back to the robot when the robot is positioned directly in front of the charger;
   detecting the reflected third IR signal at the robot when the robot is positioned directly in front of the charger;
   displacing the robot in a third linear direction generally transverse to said second direction and toward the charger following detection of the reflected third IR signal at the robot to permit the robot to engage the charger for the recharging of its storate battery wherein the steps of transmitting the first and third IR signals includes directing the first and third IR signals through a generally vertically oriented narrow slot in a lateral portion of the robot.

2. The method of claim 1 further comprising the step of rotating the lateral portion of the robot containing said narrow slot about a vertical axis.

3. The method of claim 1 wherein the first IR signal is transmitted at a first frequency and said second and third IR signals are transmitted at a second frequency.

4. The method of claim 1 wherein the step of displacing said robot in a generally linear first direction toward and to within a predetermined distance from the charger includes directing a first acoustic signal toward said charger and detecting said first acoustic signal reflected therefrom.

5. The method of claim 4 wherein the step of displacing the robot in a generally circular second direction when the robot is within said predetermined distance from the charger includes determining in which direction to turn the robot for positioning the robot directly in front of the charger as the robot is displaced in said second direction.

6. The method of claim 5 wherein the step of determining in which direction to turn the robot for positioning the robot directly in front of the charger includes the steps of directing a second acoustic signal toward the charger, detecting said second acoustic signal reflected from the wall adjacent to the charger, comparing the distances from the robot to those portions of the wall to the left and right of the charger by means of said reflected second acoustic signal, and turning the robot in said second direction toward those portions of the wall which are farther from the robot relative to the charger.

7. The method of claim 1 further comprising the steps of detecting objects between the robot and the charger as the robot is displaced in said first direction toward the charger and displacing the robot upon detection of an object between the robot and the charger such that any such objects are no longer positioned between the robot and the charger.

8. For use with a mobile robot having an upper rotating head, a lower displaceable base and a rechargeable battery, a navigation system for directing said robot to a charger positioned adjacent to a wall following detection of a low charge state in said battery for the recharging thereof, said navigation system comprising:

a first infrared (IR) signal source positioned in the rotating head of the robot for emitting first and second narrow beam IR signals wherein said first IR signal scans 360° about the robot; wherein the upper rotating head of the robot includes a generally vertically oriented slot therein and said first IR signal source includes a plurality of light emitting (LED's) positioned within said rotating head and aligned in a liear array parallel with and adjacent to said head mounted slot;

a second IR signal detector/source positioned adjacent to the charger and responsive to said first IR signal incident thereon for emitting a third, generally omnidirectional IR signal;

a third IR signal detector positioned on the robot's rotating head and responsive to said third IR signal for providing a first direction of displacement from the robot to the charger;

first sonar detection means positioned in the robot's base for detecting when the robot is at a predetermined distance from the charger along said first direction of displacement;

second sonar detection means positioned in the robot's head for determining the direction the robot must turn to follow a generally circular path in positioning itself directly in front of the charger; and reflecting means positioned adjacent to the charger for reflecting the second IR signal back to the third IR signal detector when the robot is directly in front of the charger and for indicating to the robot when to turn for displacement toward and engagement with the charger.

9. The navigation system of claim 8 wherein said second IR signal detector/source includes a plurality of LED's and photodiodes.

10. The navigation system of claim 11 wherein said LED's and photodiodes are arranged to cover a 180° sector forward of the wall adjacent to which the charger is positioned.

11. The navigation system of claim 10 wherein said photodiodes are positioned immediately adjacent to said reflecting means and wherein said photodiodes and said reflecting means are positioned on the wall at the same height as the robot's rotating head.

12. The navigation system of claim 11 wherein said LED's and photodiodes are coupled such that upon receipt of said first IR signal by said photodiodes, the LED's emit said third IR signal.

13. The navigation system of claim 8 wherein said third IR signal detector includes a photodiode.

14. The navigation system of claim 8 wherein said first sonar detection means includes an acoustic transducer positioned on a forward portion of the robot's base.

15. The navigation system of claim 8 wherein said second sonar detection means includes the combination of a vertically directed acoustic transducer and a rotating reflector aligned therewith for reflecting acoustic signals in a generally horizontal direction.

16. The navigation system of claim 8 wherein said first and second IR signals are at different frequencies.

* * * * *

UNITED STATES PATENT AND TRADEMARK OFFICE
CERTIFICATE OF CORRECTION

PATENT NO. : 4,679,152
DATED : July 7, 1987
INVENTOR(S) : Terry A. Perdue

It is certified that error appears in the above-identified patent and that said Letters Patent is hereby corrected as shown below:

In Claim 10, line 1 of the Patent, change "11" to --9--.

Signed and Sealed this

Tenth Day of November, 1987

Attest:

DONALD J. QUIGG

Attesting Officer

Commissioner of Patents and Trademarks